(12) United States Patent
Maley et al.

(10) Patent No.: US 11,060,525 B2
(45) Date of Patent: Jul. 13, 2021

(54) CLOSED LOOP TEMPERATURE CONTROL SYSTEM FOR TURBOCHARGER COMPRESSOR OUTLET TEMPERATURE

(71) Applicant: GM GLOBAL TECHNOLOGY OPERATIONS LLC, Detroit, MI (US)

(72) Inventors: John Maley, Howell, MI (US); Douglas C. Sarsen, Hartland, MI (US); Casey S. Anderson, Commerce Township, MI (US); Joshua D. Cowgill, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/684,781

(22) Filed: Nov. 15, 2019

(65) Prior Publication Data

US 2021/0148373 A1    May 20, 2021

(51) Int. Cl.
| | | |
|---|---|---|
| *F04D 27/00* | (2006.01) | |
| *F02D 23/00* | (2006.01) | |
| *F02D 41/00* | (2006.01) | |
| *F02D 41/22* | (2006.01) | |
| *F02D 41/14* | (2006.01) | |

(52) U.S. Cl.
CPC ......... *F04D 27/006* (2013.01); *F02D 23/005* (2013.01); *F02D 41/0007* (2013.01); *F02D 41/222* (2013.01); *F02D 41/1446* (2013.01); *F02D 2200/0414* (2013.01); *F05B 2220/40* (2013.01)

(58) Field of Classification Search
CPC .. F04D 27/006; F02D 41/222; F02D 41/0007; F02D 23/005; F02D 41/1446; F02D 2200/0414; F05B 2220/40
See application file for complete search history.

(56) References Cited

U.S. PATENT DOCUMENTS

| | | | |
|---|---|---|---|
| 6,253,551 B1 * | 7/2001 | Lohmann | ................ F02D 23/00 60/602 |
| 9,169,790 B2 | 10/2015 | Dixon | |
| 9,657,634 B2 | 5/2017 | Marlett et al. | |
| 2004/0194465 A1 * | 10/2004 | Bolz | ....................... F02B 39/10 60/612 |
| 2011/0113773 A1 * | 5/2011 | Liu | ..................... F02D 41/1448 60/602 |

(Continued)

*Primary Examiner* — Brandon D Lee
(74) *Attorney, Agent, or Firm* — Harness, Dickey & Pierce, P.L.C.

(57) ABSTRACT

A control system for a turbocharger of a vehicle includes an enable module, an error module, a reduction module, and a boost module. The enable module is configured to: enable reduction in a boost pressure setpoint of a compressor of the turbocharger based on whether a fault exists, load on an engine, and a compressor outlet temperature; and generate an enable signal indicating whether reduction in the boost pressure setpoint is enabled. The error module configured to determine a difference between the compressor outlet temperature and a predetermined limit. The reduction control module is configured to, in response to the enable signal indicating reduction in the boost pressure setpoint is enabled, reduce the boost pressure setpoint based on the difference. The boost module is configured to adjust boost pressure output of the compressor based on the boost pressure setpoint.

18 Claims, 4 Drawing Sheets

(56) References Cited

U.S. PATENT DOCUMENTS

| | | | |
|---|---|---|---|
| 2015/0113981 A1* | 4/2015 | Marlett | F02D 41/0007 60/602 |
| 2016/0237910 A1 | 8/2016 | Saito et al. | |
| 2017/0016388 A1* | 1/2017 | Xiao | F02B 37/14 |

* cited by examiner

CLOSED LOOP TEMPERATURE CONTROL SYSTEM FOR TURBOCHARGER COMPRESSOR OUTLET TEMPERATURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to control of turbochargers.

A vehicle may include a turbocharger (or "turbo") for increasing efficiency and power output of an internal combustion engine (ICE). The turbocharger typically includes a turbine and a compressor. Exhaust gas from the ICE is passed through the turbine and rotates a turbine wheel, which is attached to a compressor wheel of the compressor via a shaft. Rotation of the turbine wheel causes the compressor wheel to rotate, which in turn compresses intake air prior to be provided to the ICE. As additional air is injected into cylinders of the ICE, a proportional amount of increased fuel may also be injected into the cylinders and as a result power output of the ICE is increased.

SUMMARY

A control system for a turbocharger of a vehicle is provided. The control system includes an enable module, an error module, a reduction module, and a boost module. The enable module is configured to: enable reduction in a boost pressure setpoint of a compressor of the turbocharger based on whether a fault exists, load on an engine, and a compressor outlet temperature; and generate an enable signal indicating whether reduction in the boost pressure setpoint is enabled. The error module configured to determine a difference between the compressor outlet temperature and a predetermined limit. The reduction control module is configured to, in response to the enable signal indicating reduction in the boost pressure setpoint is enabled, reduce the boost pressure setpoint based on the difference. The boost module is configured to adjust boost pressure output of the compressor based on the boost pressure setpoint.

In other features, the enable module, the error module, and the reduction control module provide closed loop feedback control of the compressor outlet temperature.

In other features, the control system further includes a fault module configured to determine whether there is a fault with a compressor outlet temperature sensor and generate a fault signal indicating a fault exists with the compressor outlet temperature sensor. The enable module is configured to disable reduction in the boost pressure setpoint based on the fault signal.

In other features, the control system further includes a fuel module configured to generate a fuel request signal indicative of an amount of fuel requested. The enable module is configured to disable reduction in the boost pressure setpoint based on the fuel request signal.

In other features, the enable module is configured to disable reduction in the boost pressure setpoint based on an amount of load on the engine.

In other features, the enable module is configured to: compare the compressor outlet temperature to a predetermined temperature; and disable reduction in the boost pressure setpoint when the compressor outlet temperature is less than or equal to the predetermined temperature.

In other features, the reduction control module is configured to refrain from reducing the boost pressure setpoint until the compressor outlet temperature is within a predetermined range of a compressor temperature limit.

In other features, the reduction control module is configured to reduce the boost pressure setpoint based on at least one of (i) the difference being less than a predetermined amount or (ii) a rate at which the compressor outlet temperature is approaching a compressor temperature limit.

In other features, the control system further includes the turbocharger. The turbocharger includes the compressor and a variable geometry turbine including an actuator. The boost module is configured to adjust a position of the actuator based on the boost pressure setpoint.

In other features, the engine is a diesel engine.

In other features, a boost reduction method for a turbocharger of a vehicle is provided. The method includes: enabling reduction in a boost pressure setpoint of a compressor of the turbocharger based on whether a fault exists, load on an engine, and a compressor outlet temperature; generating an enable signal indicating whether reduction in the boost pressure setpoint is enabled; determining a difference between the compressor outlet temperature and a predetermined limit; in response to the enable signal indicating reduction in the boost pressure setpoint is enabled, reducing the boost pressure setpoint based on the difference; and adjusting boost pressure output of the compressor based on the boost pressure setpoint.

In other features, the method includes providing closed loop feedback control of the compressor outlet temperature, where the closed loop feedback control includes the enabling of reduction in the boost pressure setpoint, determining the difference, and reducing the boost pressure setpoint.

In other features, the method further includes: determining whether there is a fault with a compressor outlet temperature sensor; generating a fault signal indicating a fault exists with the compressor outlet temperature sensor; and disabling reduction in the boost pressure setpoint based on the fault signal.

In other features, the method further includes: generating a fuel request signal indicative of an amount of fuel requested; and disabling reduction in the boost pressure setpoint based on the fuel request signal.

In other features, the method further includes disabling reduction in the boost pressure setpoint based on an amount of load on the engine.

In other features, the method further includes: comparing the compressor outlet temperature to a predetermined temperature; and disabling reduction in the boost pressure setpoint when the compressor outlet temperature is less than or equal to the predetermined temperature.

In other features, the method further includes refraining from reducing the boost pressure setpoint until the compressor outlet temperature is within a predetermined range of a compressor temperature limit.

In other features, the method further includes reducing the boost pressure setpoint based on at least one of (i) the difference being less than a predetermined amount or (ii) a rate at which the compressor outlet temperature is approaching a compressor temperature limit.

In other features, the method further includes adjusting a position of an actuator based on the boost pressure setpoint, wherein the turbocharger comprises the compressor and a variable geometry turbine including the actuator.

In other features, the engine is a diesel engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A control system of a vehicle may limit temperature of charged air output from a turbocharger (referred to as "compressor outlet temperature (COT))" to prevent degradation of the turbocharger over time. The components of a turbocharger rotate at high speeds. When temperatures within the turbocharger exceed predetermined thresholds, degradation of the components can occur.

A control system may utilize open loop control to limit COT based on, for example, an induction air temperature (IAT) of the compressor or an outside air temperature (OAT), also referred to as ambient air temperature. OAT may be a temperature external to a vehicle, a temperature under a hood of a vehicle, or other temperature external to an engine of the vehicle. The control system is calibrated, such that as IAT or OAT increases, a boost pressure setpoint of the turbocharger is reduced to prevent the COT from exceeding a predetermined limit. The calibration accounts for extreme temperature conditions to prevent the predetermined limit from being exceeded when the vehicle is operated in these conditions. The boost pressure setpoint is fully reduced and/or a maximum amount of boost pressure reduction is provided when the vehicle is operated in conditions where, for example, the OAT is greater than a predetermined temperature.

Measurements of IAT and OAT can be inaccurate. For this reason, the stated calibration is also performed, such that boost pressure actions are conservative. For example, at a start of a full load operating period boost pressure may be reduced to avoid overshooting the predetermined limit. The calibration can be highly iterative to continuously compensate for changes in IAT or OAT and corresponding changes in operating efficiency and boost pressure.

The described open loop control does not provide maximum performance of a turbocharger, especially in high load conditions. The open loop control conservatively reduces boost pressure in anticipation of the predetermined limit being exceeded if the boost pressure is not reduced. This reduction can sometimes unnecessarily occur for certain conditions when the predetermined limit would not actually have been exceeded. Also, if overshoot of the predetermined limit does occur, the open loop control system is not reactionary in reducing the COT.

The examples set forth herein include a closed loop control system for reducing boost pressure based on COT or a compressor air cooler (CAC) inlet temperature. The COT and the CAC inlet temperature are typically approximately the same temperature since air out of a compressor of a turbocharger is received at an inlet of CAC. The closed loop control system is calibrated once to set a single compressor temperature limit and controls boost pressure reduction based on the compressor temperature limit. This reduces calibration time, effort and complexity. The closed loop control system maximizes turbocharger operating efficiency and as a result improves engine power output over the described open loop control. This maximized operating efficiency is provided for increased periods of time over open loop control.

Figure 1:
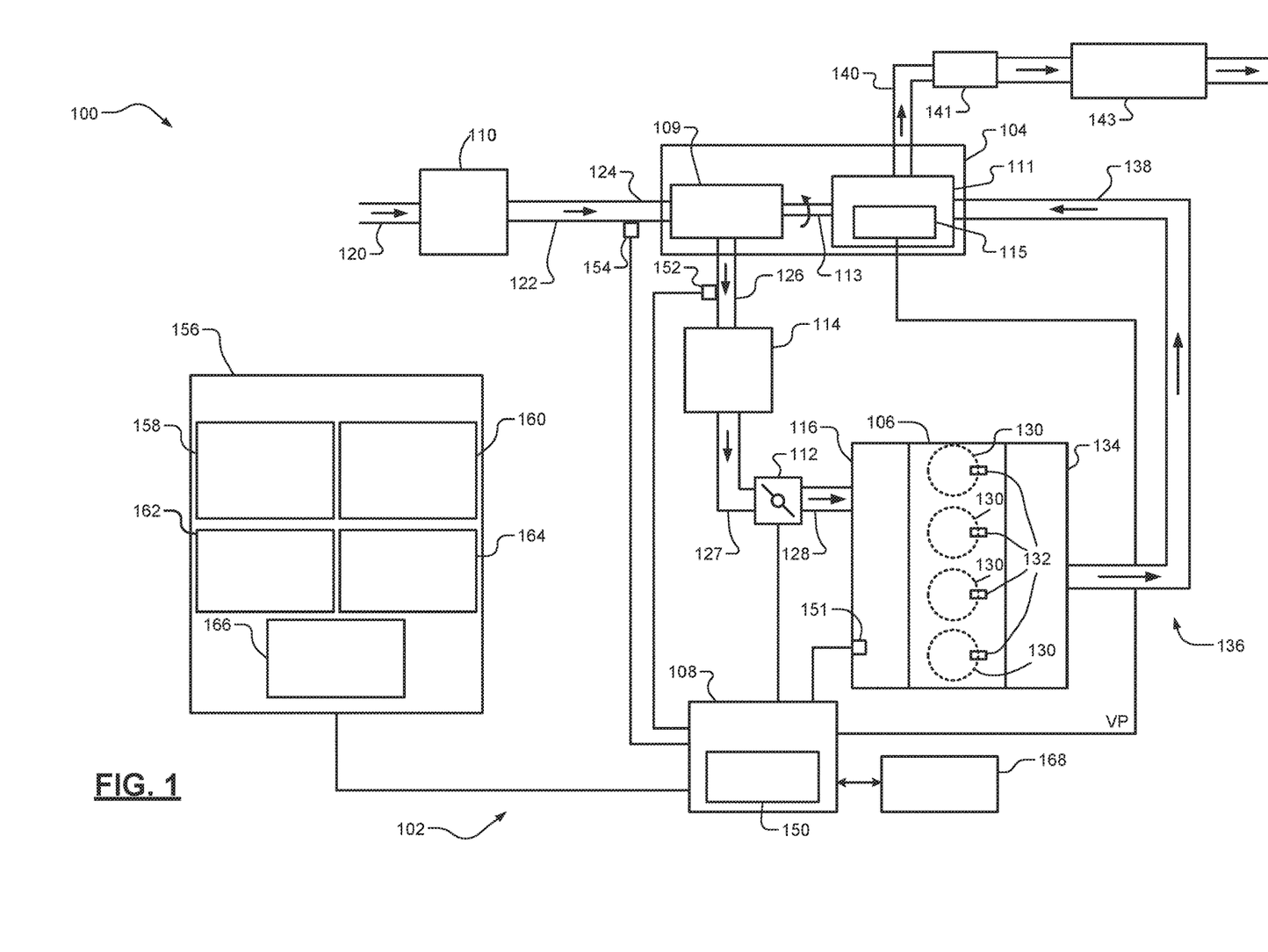
FIG. 1 is a functional block diagram of an example vehicle propulsion system including a closed loop control system for a turbocharger in accordance with the present disclosure.

FIG. 1 shows an example vehicle propulsion system 100 including a closed loop control system 102 for a turbocharger 104. The vehicle propulsion system 100 includes the turbocharger 104, an internal combustion engine (ICE) 106 and a vehicle control module 108. The turbocharger 104 includes a compressor 109 connected to a variable geometry turbine (VGT) 111 via a shaft 113. The VGT 111 includes a vane actuator 115 that actuates vanes within the VGT 111 to adjust speed of the VGT 111 and the boost pressure out of the compressor 109.

The ICE 106 may be a diesel engine or a gasoline engine. The gasoline engine systems may be alcohol-based, such as methanol, ethanol, and E85 based engine systems. The vehicle control module 108 controls operation of the ICE 106.

The ICE 106 combusts an air and fuel mixture to produce drive torque. Fresh air passes through an air filter 110 and is drawn into the turbocharger 104. The turbocharger 104 compresses the air, which is supplied to the ICE 106. The greater the compression, the greater the output of the ICE 106. The compressed air passes through a charged air cooler (CAC) 114 before entering an intake manifold 116 of the ICE 106. Supply of air from the CAC 114 to the intake manifold 116 may be adjusted by a throttle 112. Conduits 120, 122, 124 and 126-128 are shown connected to the compressor 109, the air filter 110, the throttle 112, the CAC 114 and the intake manifold 116. Although shown as being located between the CAC 114 and the intake manifold 116, the throttle 112 may be implemented as part of the intake manifold 116.

Air within the intake manifold 116 is distributed into cylinders 130 of the ICE 106. Fuel is injected into the cylinders 130 by fuel injectors 132. An air/fuel mixture in each of the cylinders 130 is combusted and creates exhaust gas. The exhaust gas exits the cylinders 130 into an exhaust manifold 134 of an exhaust system 136. An exhaust conduit 138 is connected to the exhaust manifold 134 and directs the exhaust gas to the VGT 111. The VGT 111 outputs the exhaust gas via conduit 140 to a catalytic converter (CC) 141 followed by a catalyst (underfloor) assembly 143, which may include an adsorber.

The vehicle control module 108 controls operation of the turbocharger 104 and the ICE 106. The vehicle control module 108 adjusts boost pressure out of the ICE 106 based on requested output torque and/or load of the ICE 106. As an example, the boost pressure may be adjusted based on an amount of fuel requested. The vehicle control module 108 may generate a position control signal VP that is provided to the actuator 115 to adjust the boost pressure by adjusting position of the actuator 115 and/or orientation of the vanes of the VGT 111.

The vehicle control module 108 includes a COT module 150, which performs closed loop control of the turbocharger 104. The vehicle control module 108 may control boost pressure of the compressor 109 based on a pressure indicated by a temperature manifold air pressure (TMAP) sensor 151, a temperature of the intake manifold 116, and/or a temperature indicated by a temperature sensor 152. The COT module 150 may reduce the amount of boost pressure out of the compressor 109 based on the temperature indicated by the temperature sensor 152. The temperature sensor 152 may indicate a COT or a CAC inlet temperature. The temperature sensor 152 may be attached to the conduit 126 between the compressor 109 and the CAC 114. The COT module 150 may also control operation of the turbocharger 104 based on other sensor data and non-sensor information. The other sensor data may be from, for example, a compressor inlet temperature (or induction air temperature) sensor 154 and additional sensors 156. The additional sensors 156 may include a fuel sensor 158, an ambient temperature sensor 160, a throttle position sensor 162, an engine speed sensor 164, and/or other sensors 166. One or more of the fuel sensor 158, throttle position sensor 162 and engine speed sensor 164 may be used to determine load on the ICE 106.

A memory 168 may be connected to the vehicle control module 108 and store data collected from the sensors 152, 154, 156, fault information, limit values, calibration values and/or other data. The memory 168 may be separate from the vehicle control module 108 or included as part of the vehicle control module 108.

Figure 2:
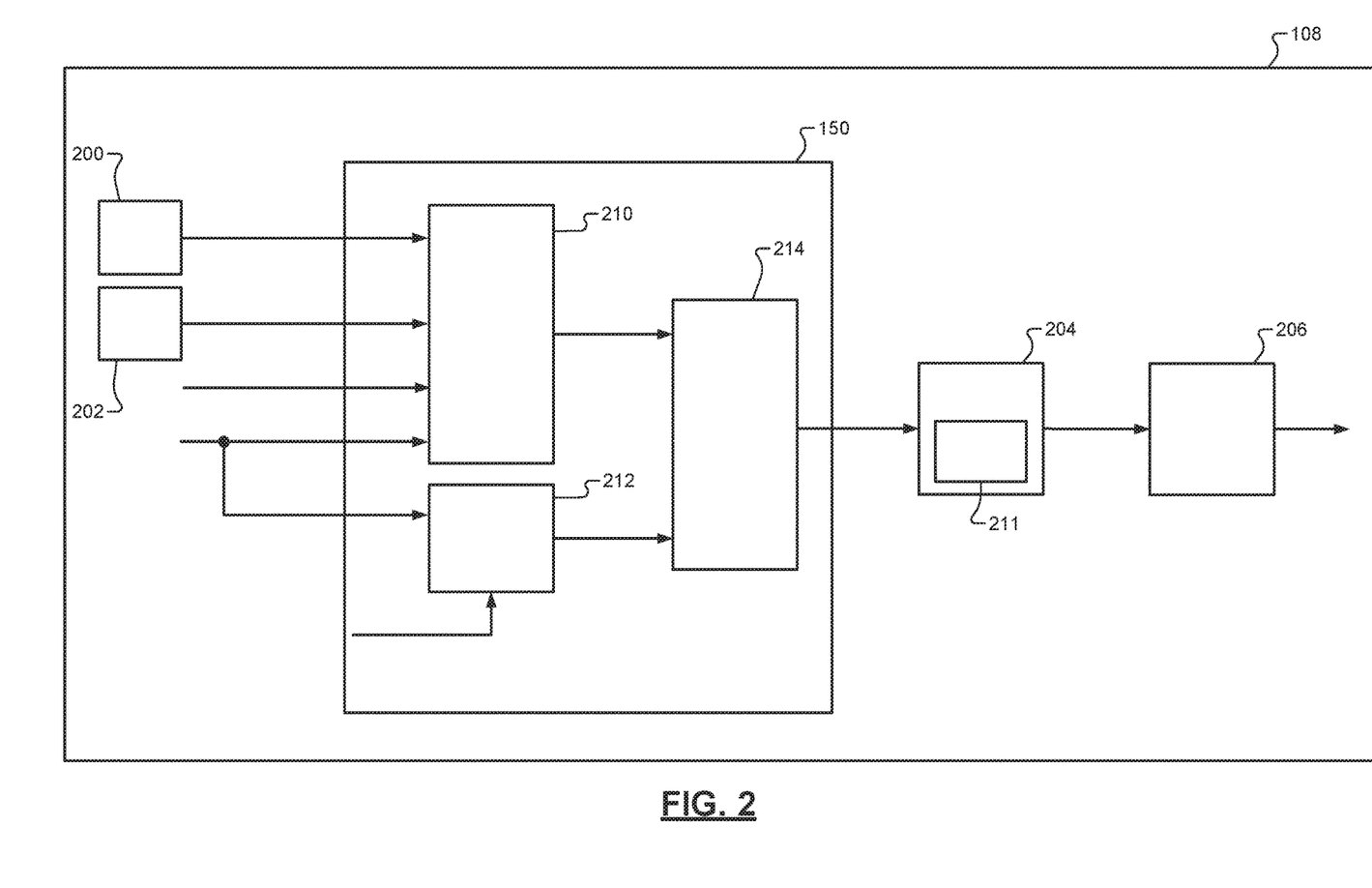
FIG. 2 is a functional block diagram of an example vehicle control module including a compressor outlet temperature (COT) module in accordance with the present disclosure.

FIG. 2 shows the vehicle control module 108 including the COT module 150, a fault module 200, a fuel module 202, a boost module 204 and a VGT actuator module 206. The COT module 150 may include an enable module 210, an error module 212 and a reduction control module 214. The COT module 150, the reduction control module 214 and/or the VGT actuator module 206 may be implemented as proportional integral derivative (PID) controllers providing closed loop control.

The fault module 200 determines whether any faults exist and generates a fault signal FLT, which is provided to the enable module 210 to report the existing faults. The fault signal FLT may indicate for example if there is a fault with a particular sensor, such as one of the sensors 152, 154, 156 of FIG. 1 and identify the sensor. In one embodiment, the fault signal FLT indicates whether there is a fault with one of the sensors, such as one of the sensors 151, 152.

The fuel module 202 may provide a fuel request signal FUELREQ to the enable module 210 indicating an amount of fuel requested, which may be directly proportional to an amount of load on the ICE 106 of FIG. 1. The boost module 204 generates a boost control signal BST CONTROL based on a stored boost setpoint 211 and a boost reduction BST RED signal from the COT module 150. The boost pressure setpoint 211 may be determined by the vehicle control module 108 based on, for example, pressure within the intake manifold 116, as described above. The VGT actuator module 206 controls positions of vanes of the VGT 111 of FIG. 1 based on the boost control signal BST CONTROL from the boost module 204. The enable module 210 may receive other information that is related to the amount of load on the ICE 106. For example, the enable module 210 may receive an engine speed signal ENGSPD from the engine speed sensor 164 and/or other signals, such as an output of the sensors 158, 162 of FIG. 1.

Operations of the modules 108, 150, 200, 202, 204, 206, 210, 212, 214 are further described below with respect to the method of FIG. 3.

Figure 3:
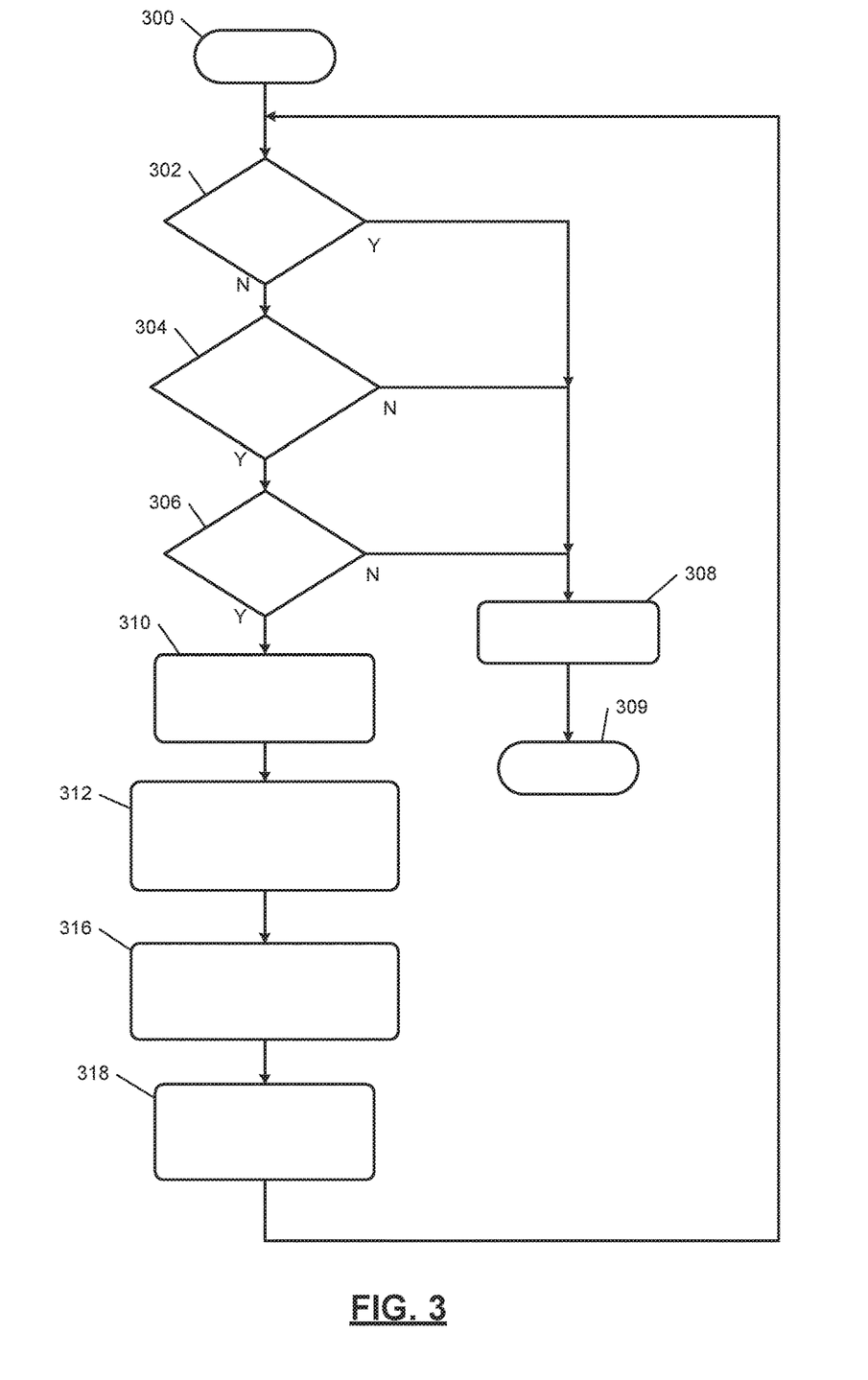
FIG. 3 illustrates a boost reduction method in accordance with the present disclosure.

The system disclosed herein may be operated using numerous methods, an example method is illustrated in FIG. 3. In FIG. 3, a boost reduction method is shown. Although the following operations are primarily described with respect to the implementations of FIGS. 1-2, the operations may be easily modified to apply to other implementations of the present disclosure. The operations may be iteratively performed by the vehicle control module 108 and/or the COT module 150.

The method may begin at 300. At 302, the enable module 210 determines, based on the fault signal FLT, whether a fault exists that would prevent performing boost pressure reduction. For example, if there is a fault associated with the temperature sensor 152, then boost pressure reduction may be prevented. If a fault does not exist that would prevent boost pressure reduction, then operation 304 may be performed, otherwise operation 308 may be performed to disable boost reduction and the method may end at 309.

At 304, the enable module 210 determines whether the COT outlet temperature is greater than a minimum temperature. The minimum temperature may be a predetermined and stored minimum temperature. If yes, operation 306 may be performed, otherwise operation 308 may be performed to disable boost reduction and the method may end at 309.

At 306, the enable module 210 determines whether load on the ICE 106 is greater than a minimum amount of load. The minimum amount of load may be a predetermined and stored minimum load. In one embodiment, the enable module 210 determines whether an amount of fuel requested is greater than predetermined fuel threshold (or minimum fuel threshold). If yes, operation 310 is performed, otherwise operation 308 may be performed to disable boost reduction and the method may end at 309.

At 310, the enable module 210 enables boost pressure reduction if not already enabled. Enabling boost pressure reduction means permitting the boost pressure to be reduced by, for example, the reduction control module 214.

At 312, the error module 212 determines a difference (or error value) between the COT outlet temperature and a compressor temperature limit COMPTempLIM. In one embodiment, the difference is equal to the COT outlet temperature minus the compressor temperature limit COMPTempLIM. The compressor temperature limit COMPTempLIM may be a maximum temperature of the compressor 109 and/or a maximum air output temperature of the compressor 109. An absolute value of the difference may be determined. This difference and/or absolute value may be stored in the memory 168.

At 316, the boost module 204 determine how much to reduce boost pressure based on the difference, shown in FIG. 2. The closer the COT outlet temperature is to the compressor temperature limit COMPTempLIM, the more the boost pressure is reduced. The quicker the COT outlet temperature approaches the compressor temperature limit COMPTempLIM, the quicker and/or more the boost pressure is reduced. The boost pressure may not be reduced until the difference is less than a predetermined threshold. In one embodiment, the amount of reduction is directly and inversely proportional to the difference. As an example, the difference may be multiplied by a predetermined factor to determine the amount of boost pressure reduction.

At 318, the boost module 204 adjusts the boost pressure based on the determined amount of boost pressure reduction. As an example, the boost module 204 may compare the amount of boost pressure reduction to the boost pressure setpoint 211, which is a target boost pressure out of the compressor 109, and reduce the target boost pressure by the amount of boost pressure reduction. This may be indicated in the boost control signal BST CONTROL. The VGT actuator module 206 may then convert the updated boost pressure setpoint to a vane position and generate the vane position control signal VP. The vane position control signal VP is provided to the actuator 115 to adjust position of the actuator 115 and/or orientation of one or more vanes of the VGT 111 to provide boost pressure out of the compressor 109 that matches the updated boost pressure setpoint. Operation 302 may be performed subsequent to operation 318.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 4:
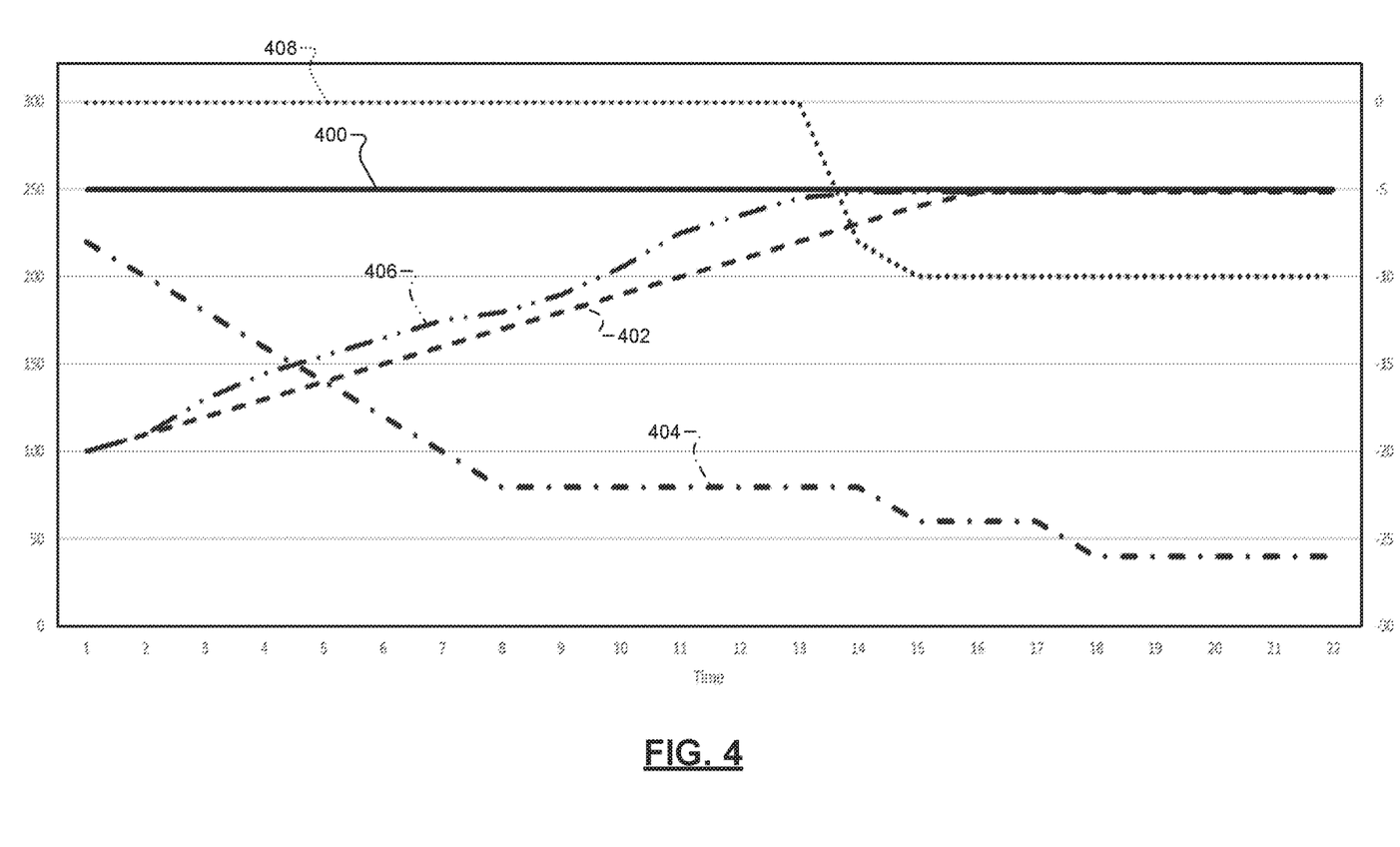
FIG. 4 is an example plot of a compressor temperature limit, compressor outlet temperatures, and boost reduction values for open loop control and closed loop control systems.

FIG. 4 shows an example plot of a compressor temperature limit 400, compressor outlet temperatures 402 and boost reduction values 404 for an open loop control system, and compressor outlet temperatures 406 and boost reduction values 408 for a closed loop control system, such as that disclosed herein. For the example shown, the corresponding vehicle is driving up an inclined surface and load on the engine is increasing. The same engine loading conditions are provided for the open loop control system as provided for the closed loop control system.

As can be seen from the plots, the closed loop system reduces boost pressure less and as a result provides increased boost pressure throughout the period shown. The closed loop system allows for the compressor outlet temperatures to increase more often for higher boost pressure operation. The boost pressure for the open loop control system is reduced prior to the compressor outlet temperature reaching the limit 400. This reduces vehicle performance, increases turbine inlet temperature and reduces output torque of engine. This reduction also increases soot production prematurely due to a large reduction in boost pressure setpoint and results in a shorter exhaust system regeneration interval (e.g., amount of time between regeneration periods of the adsorber of the underfloor assembly 143 of FIG. 1).

In contrast, the boost is maintained at a boost base setpoint (or higher boost level) longer for the closed loop system, which does not reduce the boost pressure until the compressor outlet temperature is within a predetermined range or approximately equal to the limit 400. In addition, the boost pressure of the open loop control system is unnecessarily reduced more than is needed to protect the compressor from overheating. As a result, engine performance is improved with the closed loop control system.

The above disclosed examples implement a feedback control algorithm utilizing COT outlet temperature (or CAC inlet temperature) for adjusting boost pressure. This is different than using these temperatures for diagnostic purposes, such as for determining a state of a compressor of a turbocharger. The examples may be implemented for high loading conditions when compressor temperatures rise due to increased speed and pressure. The examples reduce calibration effort to limit compressor outlet temperature below a calibrateable threshold that accounts for extreme ambient conditions when ambient temperatures are greater than a predetermined threshold (e.g., greater than 95° F.-120° F.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for a turbocharger of a vehicle, the control system comprising:
   an enable module configured to
      enable reduction in a boost pressure setpoint of a compressor of the turbocharger based on whether a fault exists with a sensor of a propulsion system, load on an engine, and a compressor outlet temperature, and
      generate an enable signal indicating whether reduction in the boost pressure setpoint is enabled;
   an error module configured to determine a difference between the compressor outlet temperature and a predetermined limit;
   a reduction control module configured to
   in response to reduction in the boost pressure setpoint not being enabled, refrain from reducing the boost pressure setpoint, and
   in response to the enable signal indicating reduction in the boost pressure setpoint is enabled, reduce the boost pressure setpoint based on the difference; and
   a boost module configured to adjust boost pressure output of the compressor based on the boost pressure setpoint.

2. The control system of claim 1, wherein the enable module, the error module, and the reduction control module provide closed loop feedback control of the compressor outlet temperature.

3. The control system of claim 1, further comprising a fault module configured to determine whether there is a fault with the sensor and generate a fault signal indicating a fault exists with the compressor outlet temperature sensor,
   wherein
      the sensor is implemented as a compressor outlet temperature sensor,
      the predetermined limit is a maximum operating temperature limit of the compressor, and
      the enable module is configured to disable reduction in the boost pressure setpoint based on the fault signal.

4. The control system of claim 1, further comprising a fuel module configured to generate a fuel request signal indicative of an amount of fuel requested,
   wherein the enable module is configured to disable reduction in the boost pressure setpoint based on the fuel request signal.

5. The control system of claim 1, wherein the enable module is configured to disable reduction in the boost pressure setpoint based on an amount of load on the engine.

6. The control system of claim 1, wherein the enable module is configured to:
   compare the compressor outlet temperature to a predetermined temperature; and
   disable reduction in the boost pressure setpoint when the compressor outlet temperature is less than or equal to the predetermined temperature.

7. The control system of claim 1, wherein the reduction control module is configured to refrain from reducing the boost pressure setpoint until the compressor outlet temperature is within a predetermined range of a compressor temperature limit.

8. The control system of claim 1, wherein the reduction control module is configured to reduce the boost pressure setpoint based on at least one of (i) the difference being less than a predetermined amount or (ii) a rate at which the compressor outlet temperature is approaching a compressor temperature limit.

9. The control system of claim 1, further comprising the turbocharger, wherein:
the turbocharger comprises the compressor and a variable geometry turbine including an actuator; and
the boost module is configured to adjust a position of the actuator based on the boost pressure setpoint.

10. A boost reduction method for a turbocharger of a vehicle, the method comprising:
enabling reduction in a boost pressure setpoint of a compressor of the turbocharger based on whether a fault exists with a sensor of a propulsion system, load on an engine, and a compressor outlet temperature;
generating an enable signal indicating whether reduction in the boost pressure setpoint is enabled;
determining a difference between the compressor outlet temperature and a predetermined limit;
in response to reduction in the boost pressure setpoint not being enabled, refraining from reducing the boost pressure setpoint;
in response to the enable signal indicating reduction in the boost pressure setpoint is enabled, reducing the boost pressure setpoint based on the difference; and
adjusting boost pressure output of the compressor based on the boost pressure setpoint.

11. The method of claim 10, comprising providing closed loop feedback control of the compressor outlet temperature, wherein the closed loop feedback control includes the enabling of reduction in the boost pressure setpoint, determining the difference, and reducing the boost pressure setpoint.

12. The method of claim 10, further comprising:
determining whether there is a fault with the sensor, wherein the sensor is a compressor outlet temperature sensor;
generating a fault signal indicating a fault exists with the compressor outlet temperature sensor; and
disabling reduction in the boost pressure setpoint based on the fault signal.

13. The method of claim 10, further comprising:
generating a fuel request signal indicative of an amount of fuel requested; and
disabling reduction in the boost pressure setpoint based on the fuel request signal.

14. The method of claim 10, further comprising disabling reduction in the boost pressure setpoint based on an amount of load on the engine.

15. The method of claim 10, further comprising:
comparing the compressor outlet temperature to a predetermined temperature; and
disabling reduction in the boost pressure setpoint when the compressor outlet temperature is less than or equal to the predetermined temperature.

16. The method of claim 10, further comprising refraining from reducing the boost pressure setpoint until the compressor outlet temperature is within a predetermined range of a compressor temperature limit.

17. The method of claim 10, further comprising reducing the boost pressure setpoint based on at least one of (i) the difference being less than a predetermined amount or (ii) a rate at which the compressor outlet temperature is approaching a compressor temperature limit.

18. The method of claim 10, further comprising adjusting a position of an actuator based on the boost pressure setpoint, wherein the turbocharger comprises the compressor and a variable geometry turbine including the actuator.

* * * * *